United States Patent [19]

Inamoto

[11] Patent Number: 4,698,645

[45] Date of Patent: Oct. 6, 1987

[54] INK-JET RECORDING HEAD WITH AN IMPROVED BONDING ARRANGEMENT FOR THE SUBSTRATE AN COVER COMPRISING THE HEAD

[75] Inventor: Tadayoshi Inamoto, Machida, Japan

[73] Assignee: Canon Kabushiki Kaisha, Tokyo, Japan

[21] Appl. No.: 705,520

[22] Filed: Feb. 26, 1985

[30] Foreign Application Priority Data

Mar. 1, 1984 [JP] Japan .................................. 59-37305

[51] Int. Cl.[4] .............................................. G01D 15/18

[52] U.S. Cl. ................................................. 346/140 R

[58] Field of Search .......................................... 346/140

[56] References Cited

U.S. PATENT DOCUMENTS 4,394,670 7/1983 Sugitani .............................. 346/140

4,412,224 10/1983 Sugitani .......................... 346/140 X 4,417,251 11/1983 Sugitani .......................... 346/140 X 4,437,100 3/1984 Sugitani .......................... 346/140 X 4,509,063 4/1985 Sugitani .............................. 346/140

4,521,787 7/1985 Yokota ................................ 346/140

*Primary Examiner*—Joseph W. Hartary

*Attorney, Agent, or Firm*—Fitzpatrick, Cella, Harper & Scinto

[57] ABSTRACT

There is disclosed an ink-jet recording apparatus comprising a substrate, an ink channel forming member for forming an ink channel in the substrate, a cover formed on the ink channel forming member to constitute the ink channel together with the ink channel forming member, and a plurality of bonding members formed around at least the ink channel and to be bonded to the substrate and/or the cover.

10 Claims, 9 Drawing Figures

INK-JET RECORDING HEAD WITH AN IMPROVED BONDING ARRANGEMENT FOR THE SUBSTRATE AN COVER COMPRISING THE HEAD

BACKGROUND OF THE INVENTION

1. Field of the Invention

The present invention relates to an ink-jet recording head and, more particularly, to an ink-jet recording head for generating ink droplets used for a so-called ink-jet recording system.

2. Description of the Prior Art

A conventional ink-jet recording head used for an ink-jet recording system has small ink discharge ports (orifices), an ink path and an ink discharge energy generator arranged in a part of the ink path.

A conventional recording head of this type is, for example, manufactured as follows. A glass or metal substrate is prepared such that small grooves are directly formed in the upper surface by cutting, etching or the like. The substrate can also be prepared by another method whereby a photosensitive resin composition such as a photosensitive resin or a photoresist is applied to a glass or metal substrate and is patterned by photolithography to form the above-mentioned grooves. The resultant substrate is bonded to a glass or metal plate so that the grooves covered with the glass or metal form ink channel. Thereafter, the resultant structure is cut to form ink injection ports, thereby forming a recording head having a desired size.

However, according to such a conventional recording head, it is difficult to uniformly bond the pre-grooved substrate and the glass or metal cover, and to bond the cover and an ink channel forming member (to be referred to as a channel member hereinafter) obtained by the photosensitive resin composition. For this reason, an air layer may often be formed at the bonded portion. When the air layer extends in a wide area at the portion subjected to cutting of the recording head, the channel member or the cover severely vibrates, forming cracks or gaps in the surface. Cracks and gaps are also formed in the bonded surface between the substrate and the channel member and between the cover and the channel member, and cause separation. When cracks and gaps are formed in the substrate, ink enters into the substrate and reaches wires connected to an injection energy generating element in the injection energy generator. The wires are than corroded, and in a worst case, the wires are disconnected. When the channel member comprises a photosensitive resin, the adhesion strength thereof can be used to bond the substrate and the cover. For this reason, a special adhesive need not be used and uniform adhesion can be easily accomplished. Although the photosensitive resin has this advantage, the resin contracts while being cured. The contraction stress is concentrated at the cut end face, so that the resin layer is often peeled from the substrate or the cover. In order to prevent such peeling, a thin film of an adhesion accelerator such as a silane coupling agent is formed at the adhesion surface to improve the adhesion strength and prevent peeling. However, this method cannot always provide good results. Another method is also proposed wherein the channel member is eliminated from the cut surface which constitutes the injection ports. In this case, the cover severely vibrates when the head is cut. In the same manner as in the case wherein an air layer is formed in the adhesion portion, cracks and gaps are formed at the cut end face.

SUMMARY OF THE INVENTION

The present invention has been made to eliminate the above drawbacks, and has as its object to provide an ink-jet recording head which has a high manufacturing yield, high reliability and good durability.

It is another object of the present invention to provide an ink-jet recording apparatus having a substrate, a channel member for defining an ink channel formed in the substrate, and a cover formed on the channel member to constitute the ink channel together with the channel member, comprising a plurality of bonding members formed around at least the ink channel and bonded to the substrate and/or the cover.

DETAILED DESCRIPTION OF THE PREFERRED EMBODIMENT

The present invention will be described in detail with reference to the accompanying drawings. FIGS. 1 to 7 are schematic views for explaining the construction and steps in manufacturing an ink-jet recording head according to an embodiment of the present invention.

Figure 1:
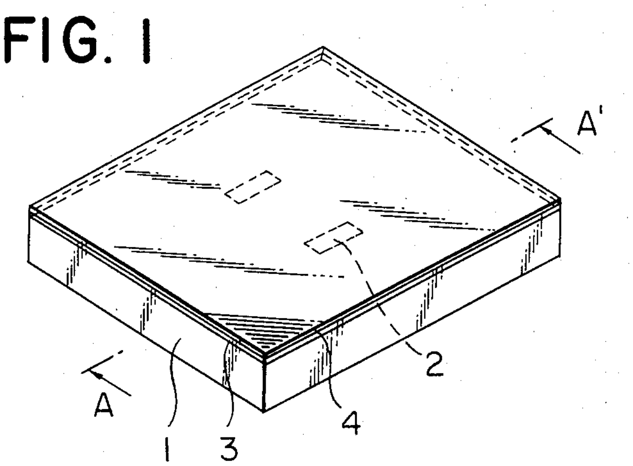
FIGS. 1 to 7 are schematic views for explaining the steps in manufacturing an ink-jet recording head according to the present invention.

As shown in FIG. 1, a desired number (two in this embodiment) of ink discharge energy generating elements 2 such as heat elements or piezoelectric elements are formed on a support 1 of glass, ceramic, plastic or a metal. When a heat element such as an electric-thermal converter is used as the element 2, the element 2 heats the ink therearound to generate ink discharge energy. However, when a piezoelectric element is used as an electro-mechanical converter, this ink discharge energy is generated by a mechanical displacement of the element. It should be noted that the elements 2 are connected to signal input electrodes (not shown).

Figure 2:
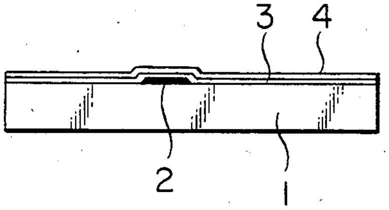

An electrically insulating layer 3 of $SiO_2$, $Ta_2O_5$, glass or the like is formed to provide electrical insulation properties. An ink-resistant layer 4 of gold, W, Ni, Ta, Nb or the like is formed on the insulating layer 3 (FIG. 2).

Figure 3:
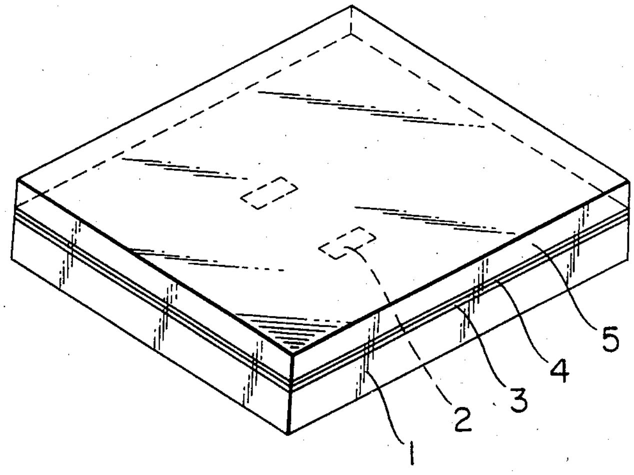

After the surface of the substrate having the ink discharge energy generating elements 2 is cleaned and dried, a dry-film photoresist heated to a temperature of 80° C. to 105° C. is applied to the substrate surface having the elements 2 at rate of 0.5 to 3 f/min and a pressure of 1 to 3 kg/cm$^2$, thereby forming a photoresist film having a thickness of 100 μm (FIG. 3). In this case, the photoresist film 5 is fixed on the surface of the substrate and will not peel from the surface even if a small external force acts thereon.

Figure 4:
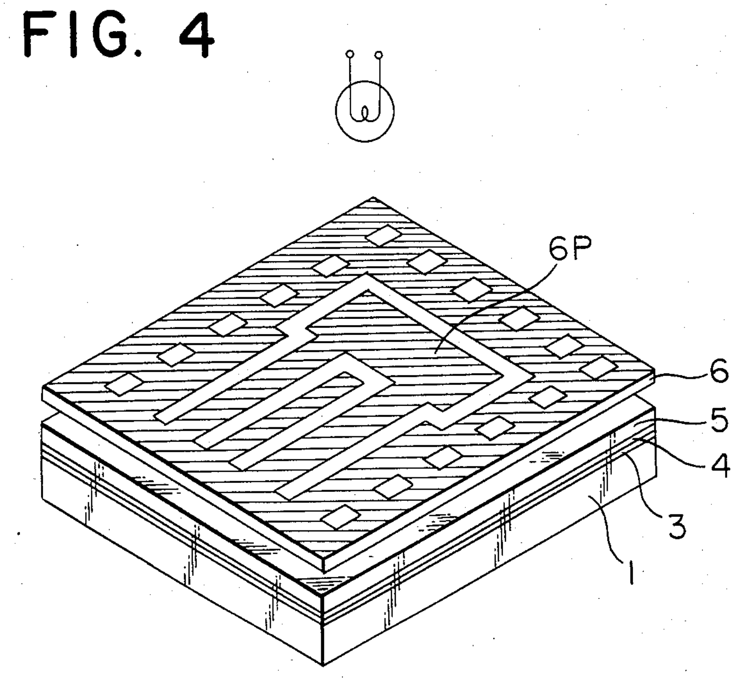

As shown in FIG. 4, a photomask 6 having a predetermined pattern 6P is aligned with the photoresist film 5, and the film 5 is exposed through the mask 6. The pattern 6P has nonexposed regions comprising a prospective ink supply chamber, prospective small ink flow paths, prospective ink injection ports and prospective bonding members (resist film portions in this embodiment) formed around the ink channel. In this embodiment, the ink channel comprises the small ink flow paths and the ink supply chamber.

The pattern 6P does not transmit light therethrough. The portion of the photoresist film 5 which is covered with the pattern 6P is not exposed. In this case, the locations of the energy generating elements 2 must be aligned, by a known method, with the pattern 6P. It is essential to locate the elements 2 immediately below the small ink flow paths.

When exposed, the portion of the photoresist film 5 which excludes the pattern 6P is subjected to polymerization and is cured. The nonexposed portion will not be cured and can be dissolved.

Figure 5:
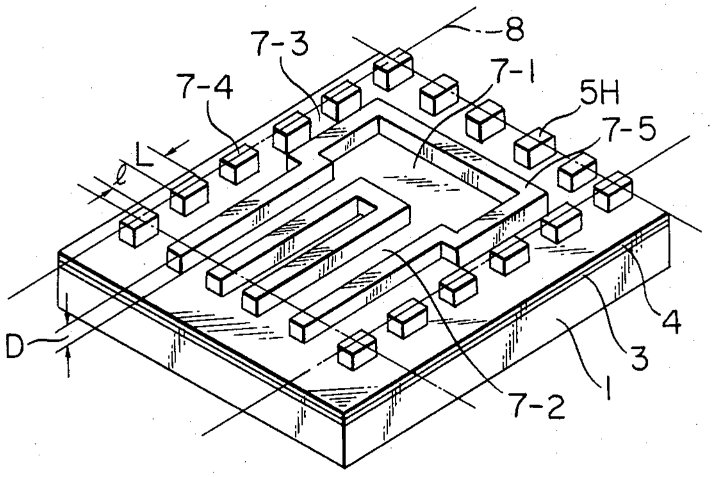

The resultant structure having the exposed photoresist film 5 is dipped in a volatile organic solvent such as trichloroethane to dissolve the non-polymerized (non-cured) photoresist. Recesses are formed in a cured photoresist film 5H in accordance with the pattern 6P, as shown in FIG. 5. Thereafter, in order to improve the resistance of the cured photoresist film 5H to solvent, the film 5H is further cured by thermal polymerization at a temperature of 130° C. to 160° C. for 10 min to 60 min or by ultraviolet radiation, or by both.

Among the recesses formed in the cured photoresist film 5H as the channel member remained on the substrate, a recess 7-1 serves as an ink supply chamber in the finished ink-jet head, recesses 7-2 serve as small ink flow paths, and recesses 7-3 serve as a plurality of spaces formed along a cutting direction 8 after a cover (not shown) is laminated. Among portions of the cured photoresist film 5H which are left on the substrate 1, portions 7-4 serve as a plurality bonding members formed alternately with the spaces 7-3 around a channel member 7-5 along the cutting direction 8. The cured photoresist film 5H is fixed on the substrate and will not peel off upon application of a small external force. However, when severe vibration acts on the film 5H during cutting, cracks and gaps are formed, resulting in electrical disconnections. The bonding members 7-4 need not be formed of the same material as that of the channel member. However, according to this embodiment, since the bonding members 7-4 and the spaces 7-3 can be formed simultaneously with the small ink flow paths 7-2 if they are of the same material, production efficiency can be improved to provide a low-cost recording head.

In order to prevent formation of an air layer during bonding of the cover and to avoid vibration of the cover during cutting, the spaces 7-3 defined by the substrate and the bonding members 7-4 are alternately formed along the cutting direction 8.

When a contact area between the bonding members 7-4 and the cover is excessively increased, an air layer is formed therebetween. Again, when the spaces are excessively large, the portion supporting the cover becomes thinner, thereby increasing vibration of the substrate and the cover. Therefore, a distance between the opposing ends of every two adjacent bonding members 7-4, i.e., a length l of the space 7-3 along the cutting direction is set to not more than 10 times a thickness D of the bonding member, i.e., condition the $l/D \leqq 10$ is established. A length L of each bonding member along the cutting direction is set to not more than 15 times the thickness D, i.e., condition $L/D \leqq 15$ is established. It should be noted that the ink channel includes the small ink flow paths 7-2 and the ink supply chamber 7-1, the thickness D of the bonding member between the substrate and the cover is the thickness in a direction perpendicular to the cutting direction, and the length l of the space and the length L of the bonding member are given along a direction parallel to the cutting direction.

Figure 8:
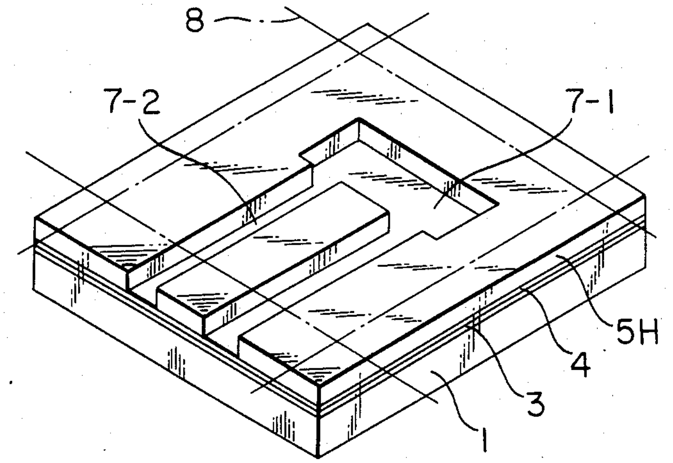
FIG. 8 PRIOR ART
FIGS. 8 and 9 are schematic views of conventional ink-jet recording heads, respectively.
Figure 9:
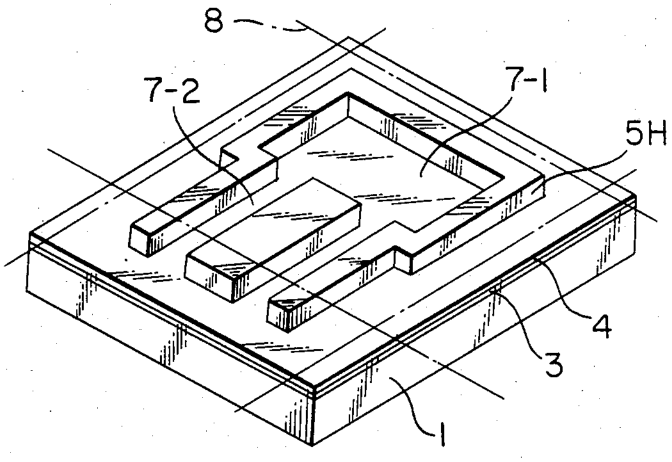
FIG. 9 PRIOR ART

In this embodiment, although the thickness of the photosensitive resin film such as a dry film used for the channel member and the bonding member 7-4 is about 100 μm, the length l of the space 7-3 is 100 to 200 μm, and the length L of the bonding member 7-4 is 150 to 200 μm. Conventionally, the photosensitive resin film is filled in a portion excluding the ink supply chamber and the small ink flow paths, so that the photosensitive resin film is formed in the entire area of the cutting region (FIG. 8). Alternatively, the photosensitive resin film is left around only the ink supply chamber and the small ink flow paths, and not left in the cutting portion (FIG. 9). However, according to the above embodiment, non-resin portions and resin portions are alternately formed along the cutting direction, and the lengths of the non-resin and resin portions are designed to be 100 to 200 μm and 150 to 200 μm, respectively.

In order to obtain a cut end face without forming an air layer during bonding and without forming an air layer during bonding and without forming cracks and gaps during cutting, the ratio l/D is preferably 10 or less and the ratio L/D is preferably 15 or less. However, more preferably, the ratio l/D is 3 or less and the ratio L/D is 5 or less.

Figure 6:
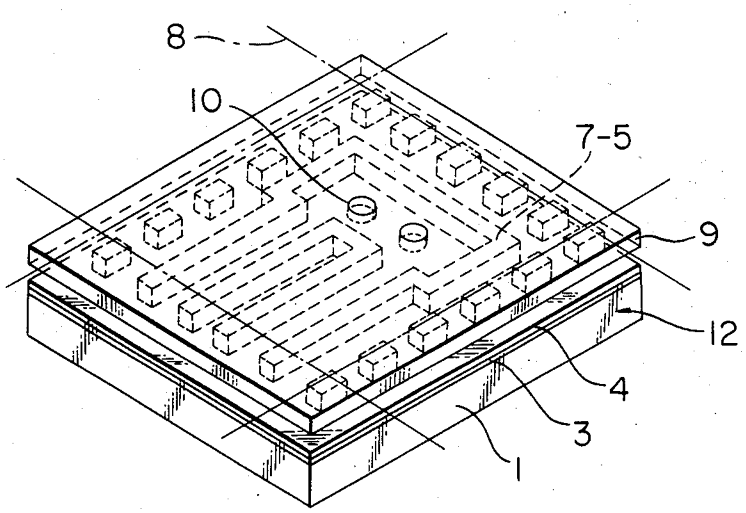

A flat plate 9 is adhered to the upper surface of the substrate having the ink supply chamber 7-1, the small ink flow paths 7-2, the spaces 7-3 and the bonding members 7-4 in the following manner, as shown in FIG. 6:

(1) An epoxy resin adhesive is applied by a spin coater to a flat plate of glass, ceramic, metal or plastic to a thickness of 3 to 4 μm, preheated to convert the adhesive to the so-called B stage, and adhered to the cured photoresist film 5H. Thereafter the epoxy resin adhesive is finally cured; or (2) A flat plate of acrylic resin, ABS resin or a thermoplastic resin (e.g., polyethylene resin) is directly thermally bonded to the cured photoresist film 5H.

It should be noted that through holes 10 are formed in the flat plate 9 to communicate with ink supply pipes (not shown).

Figure 7:
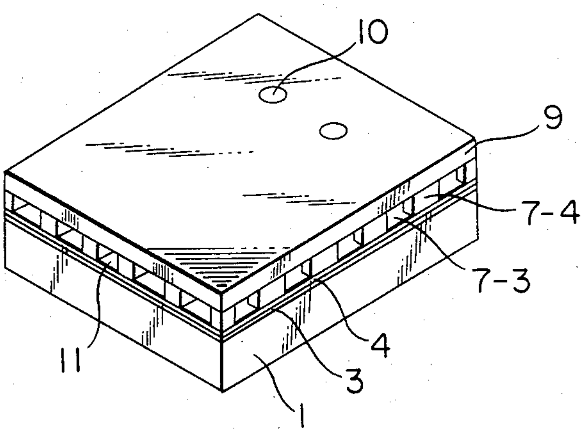

In the manner described above, the substrate is bonded to the flat plate 9 to constitute an assembly 12. The assembly 12 is cut along the cutting direction 8. This is to optimize the distance between the ink injection energy generating elements 2 and ink injection ports 11 in the small ink flow paths 7-2 and to obtain the desired head size. The cutting operation is normally performed by a diamond blade. FIG. 7 is a perspective view of the finished recording head after cutting. As shown in FIG. 7, the bonding members 7-4 and the spaces 7-3 are alternately formed along the cut end face.

The ink supply pipes (not shown) are connected to the through holes 10 to obtain the ink-jet recording head.

In the above embodiment, the channel member constituting the ink channel is deposited on the substrate and is made of the same material as the bonding members in a single process. However, the channel member and the bonding members need not be constituted of the same material or formed in the single process. For example, after the channel member is formed, bonding members of a different material such as glass can be bonded on the substrate. Furthermore, grooves for the ink channel and the projections for the bonding members can be formed by etching or the like on the substrate (i.e., the channel member is integrally formed with the substrate), and this substrate can be bonded to the cover. Furthermore, a member having recesses for the ink channel and projections for the bonding members can be prepared and bonded to the substrate. In addition to this modification, an integral member of substrate and bonding members, or of cover and bonding members can be used.

The present invention described in detail above has the following effects. Since the bonding members and the spaces are formed around the ink channel, air can escape from the bonded portion even if it enters during bonding, thereby allowing uniform bonding. In addition, the spaces are properly limited to prevent excessive vibration during cutting, thereby obtaining a smoothly cut end face. For this reason, unlike the conventional head, ink will not enter into the substrate through cracks and gaps or reach electrodes of the ink injection energy generating elements, thereby preventing electrical disconnections due to electric corrosion. Thus, a recording head of high precision can be manufactured at a high yield. In addition to this advantage, the channel member used to form the alternative pattern of spaces and adhesion members does not increase the manufacturing cost. As a result, the recording head can be obtained at low cost. The above effects of the present invention will be described in detail with reference to the Examples and the Comparative Examples.

EXAMPLES AND COMPARATIVE EXAMPLES

By varying the relationships among the thickness D and the lengths l and L shown in Table 1, 20 recording heads each having two ink supply/drain ports as shown in FIG. 7 were prepared in accordance with the manufacturing steps (FIGS. 1 to 7). Five sets of 20 recording heads were given as Examples 1 to 5. Two sets of 20 conventional recording heads shown in FIGS. 8 and 9 were prepared by the same steps as in the present invention and were given as Comparative Examples 1 and 2, respectively. That is, the recording heads according to Comparative Example 1 had the photosensitive resin throughout their entire area and did not have spaces at all. In the recording heads according to Comparative Example 2, cut portions excluding the ink discharge ports were constituted by the spaces, i.e., no presence of the photosensitive resin. It should be noted that the covers used in Examples 1 to 5 and Comparative Examples 1 and 2 comprises flat glass plates. An epoxy resin adhesive was applied to each flat glass plate, converted to the B stage and adhered to each glass plate. Thereafter, the epoxy resin adhesive was finally cured. A durability test was conducted for all the recording heads which were kept dipped in an ink composition consisting of 80% by weight of ethylene glycol, 10% by weight of N-methyl-2-pyrrolidone, and 5% by weight of water, and 5% by weight of direct black 38 at a temperature of 80° C. for 200 hours.

In the heads having no spaces at the cutting portions according to Comparative Example 1, air layers were formed throughout the entire bonded portions of 5 samples. In the heads having the air layers, an air layer formed in an area extending 0.4 to 1.3 mm parallel to the cover across the cutting portion. When the sample having the air layer in the bonding portion was cut, cracks and gaps were formed in the cover. When bonding conditions between the substrate and the cover and between the cover and the photosensitive resin film were observed for 20 samples, some were subject to peeling. Peeling of some covers or the like reached injection ports, and satisfactory ink discharge could not be performed. In Comparative Example 2, spaces were formed between the substrate and the cover at the cutting portion excluding the ink injection ports, so that incomplete adhesion between the substrate and the cover did not occur. However, since many spaces were formed along the cutting direction, cracks were found to have formed in the substrate when the substrate was closely examined. In addition, cracks were also formed in the cover. After the durability test was conducted, the samples were put into operation. Some could not inject ink since their wiring had been corroded by the ink.

Conversely, in the recording heads of the present invention, air entry, cracks and gaps at the cut end face, and peeling of the bonded portion rarely occurred. When they did occur, the prevalence of air entry, cracks, gaps and peeling was limited compared with the conventional heads. In particular, in Examples 1 to 3 satisfying conditions l/D≦10 and L/D≦15, adhesion of the covers was uniform. No air entered the cutting portions. In addition, the cut end faces were smooth. Peeling did not occur during the durability test. Proper ink droplets were formed during the ink injection test, thereby obtaining a proper printing state.

TABLE 1

| | | | | D = 100 μm, head number | | | | |
|---|---|---|---|---|---|---|---|---|
| | | | | | | After durability test | | |
| | | l/D | L/D | Air Mixing during cover bonding | Cracks and gaps at cut end face | Peeling | incomplete printing | electric disconnection during printing |
| Example | 1 | 1 | 2 | 0/20 | 0/20 | 0/20 | 0/20 | 0/20 |
| | 2 | 10 | 5 | 0/20 | 0/20 | 0/20 | 0/20 | 0/20 |
| | 3 | 5 | 15 | 0/20 | 0/20 | 0/20 | 0/20 | 0/20 |
| | 4 | 1 | 20 | 1/20 | 0/20 | 2/20 | 2/20 | 0/20 |
| | 5 | 20 | 1 | — | 5/20 | — | 0/17*[1] | 3/20 |
| Comparative | 1 | 0 | 40 | 5/20 | 0/20 | 5/20 | 2/20 | 0/20 |
| Example | 2 | 40 | 0 | — | 18/20 | — | 0/10*[1] | 10/20 |

*[1] excluding samples experienced electric disconnections

What is claimed is:

1. An ink-jet recording apparatus comprising:

a substrate, an ink channel forming member for forming an ink channel on said substrate, a cover on said ink channel forming member cooperating with said ink channel forming member to provide an ink channel, and a plurality of bonding members disposed outside said ink channel and bonded to said substrate and/or said cover, wherein said bonding members are formed alternately with spaces at an end face portion of said apparatus, said spaces being defined by said bonding members, said substrate and said cover, wherein the following conditions are satisfied:

$$l/d \leqq 10 \text{ and } L/D \leqq 15$$

where L is a length of said bonding members, D is a thickness of said bonding members, and l is a length of said spaces.

2. An apparatus according to claim 1, characterized in that said ink channel forming member is made of the same material as that of said bonding members.

3. An apparatus according to claim 2, characterized in that the material is a cured film of a photosensitive resin.

4. An apparatus according to claim 1, characterized in that said ink channel forming member is made of a material different from that of said bonding members.

5. An apparatus according to claim 1, characterized in that said ink channel forming member is integrally formed with said substrate.

6. An apparatus according to claim 1, characterized in that said bonding members are integrally formed with said substrate.

7. An apparatus according to claim 1, characterized in that said ink channel forming member and said bonding members are integrally formed with said substrate.

8. An apparatus according to claim 1, characterized in that said bonding members are integrally formed with said cover.

9. An apparatus according to claim 1, characterized in that said bonding members are made of a material selected from the group consisting of glass and a cured film of a photosensitive resin.

10. An ink-jet recording apparatus comprising:

a substrate, an ink channel forming member including at least one wall member for forming an enclosed ink channel on said substrate, a cover on said ink channel forming member cooperating with said ink channel forming member to provide said ink channel, and a plurality of bonding members disposed outside said channel and bonded to said substrate and/or said cover, said bonding members providing a plurality of spaced sites around said ink channel forming member where said cover and said substrate are bonded together, wherein said plurality of spaced sites define a substantial portion of the periphery of said apparatus, the remaining portion of the periphery of said apparatus being defined by terminal portions of said wall member, and wherein L is the length of any one of said bonding members measured along the periphery of the apparatus. l is the distance between any two of said spaced sites, D is the thickness of any one of said bonding members between said cover and said substrate, l/D is no greater than 10 and L/D is no greater than 15.

* * * * *

UNITED STATES PATENT AND TRADEMARK OFFICE

CERTIFICATE OF CORRECTION

PATENT NO. : 4,698,645

DATED : October 6, 1987

INVENTOR(S) : TADAYOSHI INAMOTO

It is certified that error appears in the above-identified patent and that said Letters Patent is hereby corrected as shown below:

AT [54] IN THE TITLE

"AN COVER" should read --AND COVER--.

COLUMN 1

Line 4, "AN COVER" should read --AND COVER--.
Line 29, "channel." should read --channels.--.
Line 50, "than" should read --then--.

COLUMN 3

Line 30, "plurality bonding" should read --plurality of bonding--.
Line 60, "condition the" should read --the condition--.
Line 63, "i.e., condition" should read --i.e., the condition--.

COLUMN 5

Line 61, "comprises" should read --comprised--.
Table 1, "samples experienced" should read --samples that experienced--.

UNITED STATES PATENT AND TRADEMARK OFFICE
CERTIFICATE OF CORRECTION

PATENT NO. : 4,698,645

DATED : October 6, 1987

INVENTOR(S) : TADAYOSHI INAMOTO

It is certified that error appears in the above-identified patent and that said Letters Patent is hereby corrected as shown below:

COLUMN 8

Line 27, "apparatus." should read --apparatus,--.
Line 28, "spaced sites," should read --bonding members,--.

Signed and Sealed this

Twenty-third Day of February, 1988

*Attest:*

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,698,645

DATED : October 6, 1987

INVENTOR(S) : TADAYOSHI INAMOTO

It is certified that error appears in the above-identified patent and that said Letters Patent is hereby corrected as shown below:

COLUMN 7

Line 4, "$1/d \leqq 10$" should read --$1/D \leqq 10$--

Signed and Sealed this

Fifth Day of December, 1989

*Attest:*

JEFFREY M. SAMUELS

*Attesting Officer* *Acting Commissioner of Patents and Trademarks*